US006510648B2

(12) United States Patent
Roberts

(10) Patent No.: US 6,510,648 B2
(45) Date of Patent: Jan. 28, 2003

(54) COASTER FOR SHIELDING AGAINST CRAWLING ARTHROPODS

(75) Inventor: Ernest H. Roberts, Davis, CA (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 10/045,491

(22) Filed: Jan. 14, 2002

(65) Prior Publication Data

US 2002/0062591 A1 May 30, 2002

Related U.S. Application Data

(62) Division of application No. 09/690,491, filed on Oct. 17, 2000.
(60) Provisional application No. 60/203,202, filed on May 11, 2000.

(51) Int. Cl.[7] .............................. A01M 1/00; A01M 1/24
(52) U.S. Cl. .................... 43/109; 43/131; 43/132.1; 248/346.11; 52/101; 16/32; 16/42 T
(58) Field of Search ...................... 43/109, 108, 107, 43/124, 132.1, 131; 52/101; 119/61, 51.5; 248/346.11; 16/32, 42 R, 42 T; 215/393, 394

(56) References Cited

U.S. PATENT DOCUMENTS

| 223,321 | A |   | 1/1880  | Denton ................. 43/109 |
|---------|---|---|---------|--------------------------------|
| 459,089 | A |   | 9/1891  | Muller ................. 43/109 |
| 519,811 | A |   | 5/1894  | Gerard ................. 43/109 |
| 672,958 | A | * | 4/1901  | McElligott ............. 43/109 |
| 898,852 | A | * | 9/1908  | Duggan ................. 43/109 |
| 1,068,258 | A |   | 7/1913  | McCombs .............. 43/109 |
| 1,242,680 | A |   | 10/1917 | Goedeke ............... 43/109 |
| 1,248,283 | A |   | 11/1917 | Derck ................. 43/109 |
| 1,251,786 | A |   | 1/1918  | Kirfman .............. 47/32.4 |
| 1,279,865 | A | * | 9/1918  | Hendershot et al. ..... 43/109 |
| 1,305,547 | A | * | 6/1919  | Joseph ................ 16/42 R |
| 1,305,553 | A |   | 6/1919  | Kruse ................. 43/109 |
| 1,325,316 | A |   | 12/1919 | Diss .................. 43/109 |
| 1,405,822 | A | * | 2/1922  | Erickson .............. 43/109 |
| 1,480,758 | A | * | 1/1924  | Hight ................. 16/42 R |
| 1,554,327 | A | * | 9/1925  | Boberg ................ 16/42 R |
| 1,581,410 | A |   | 4/1926  | Welsh ................. 43/109 |
| 1,641,127 | A | * | 8/1927  | Denslow ............... 43/109 |
| 1,745,905 | A | * | 2/1930  | Oakman ................ 43/109 |
| 1,800,613 | A |   | 4/1931  | Farrell ............... 43/109 |

(List continued on next page.)

FOREIGN PATENT DOCUMENTS

| GB | 16409 B1 | * | 7/1910 | .................. 43/109 |
| GB | 372563   |   | 5/1931 | |
| GB | 472883   |   | 4/1937 | |

*Primary Examiner*—Darren W. Ark
(74) *Attorney, Agent, or Firm*—Brian S. Steinberger; Law Offices of Brian S. Steinberger, P. A.

(57) ABSTRACT

A holder for isolating an article from a surface is comprised of a receiving member for retaining an article in a position removed from a surface. A crawling arthropod-deterring component is applied at least adjacent to lower periphery of the receiving member. A base situated below the receiving member supports and stabilizes the receiving member and distributes a load applied by the retained article.

8 Claims, 7 Drawing Sheets

U.S. PATENT DOCUMENTS

| | | | | |
|---|---|---|---|---|
| 1,814,471 A | | 7/1931 | Grove | 427/177 |
| 1,861,095 A | * | 5/1932 | Schacht | 16/42 R |
| 1,990,049 A | * | 2/1935 | Perry | 43/109 |
| 2,018,264 A | * | 10/1935 | Jones | 248/346.11 |
| 2,143,043 A | | 1/1939 | Wexler | 47/32.5 |
| 2,356,022 A | | 8/1944 | Wright | 43/120 |
| 2,502,759 A | * | 4/1950 | Singer | 16/42 R |
| 2,535,209 A | | 12/1950 | Hubert | 424/77 |
| 2,593,781 A | | 4/1952 | Meis | 43/108 |
| 3,505,724 A | * | 4/1970 | Leitner et al. | 16/42 R |
| 3,705,938 A | | 12/1972 | Hyman | 424/443 |
| 3,857,934 A | | 12/1974 | Bernstein | 424/412 |
| 3,864,468 A | | 2/1975 | Hyman | 424/411 |
| 4,102,991 A | | 7/1978 | Kydonieus | 424/416 |
| 4,400,909 A | | 8/1983 | Reese | 47/2 |
| 4,576,801 A | | 3/1986 | Parry | 427/288 |
| 4,766,695 A | | 8/1988 | Harlow | 47/32.5 |
| 4,871,541 A | | 10/1989 | Shibanai | 424/411 |
| 4,877,617 A | | 10/1989 | Namikoshi | 424/409 |
| 4,890,416 A | | 1/1990 | Roberts | 43/131 |
| 4,908,980 A | | 3/1990 | Sherman | 43/132.1 |
| 4,921,702 A | | 5/1990 | Banks | 424/404 |
| 5,088,233 A | | 2/1992 | Frankenbery | 47/32.5 |
| 5,142,817 A | * | 9/1992 | Rolf | 47/32.5 |
| 5,148,626 A | | 9/1992 | Haake, Sr. | 43/121 |
| 5,159,778 A | | 11/1992 | Metzner | 43/121 |
| 5,191,676 A | * | 3/1993 | Gerner | 16/42 R |
| 5,194,265 A | | 3/1993 | Boettcher | 424/411 |
| 5,224,288 A | | 7/1993 | Skelton | 43/131 |
| 5,274,950 A | | 1/1994 | Roberts | 43/121 |
| 5,353,556 A | | 10/1994 | Hand | 52/101 |
| 5,414,954 A | | 5/1995 | Long | 43/121 |
| 5,440,833 A | | 8/1995 | Stoll | 43/109 |
| 5,596,834 A | | 1/1997 | Ritter | 43/124 |
| 5,641,499 A | | 6/1997 | Bencsits | 424/411 |
| 5,661,925 A | | 9/1997 | MacMaster | 47/32.4 |
| 5,809,689 A | * | 9/1998 | Mathur | 47/32.4 |
| 5,819,468 A | | 10/1998 | Jollie | 47/32.4 |
| 5,881,671 A | | 3/1999 | Riedl | 119/61 |
| 5,918,411 A | | 7/1999 | Hadrava | 47/21.1 |
| 5,943,815 A | * | 8/1999 | Paganessi et al. | 43/107 |
| 5,996,531 A | * | 12/1999 | Anderson | 119/61 |
| 6,024,048 A | | 2/2000 | Potente | 119/57.9 |

* cited by examiner

COASTER FOR SHIELDING AGAINST CRAWLING ARTHROPODS

This application is a division of Ser. No. 09/690,491 filed Oct. 17, 2000 and claims priority from U.S. Provisional Application Serial No. 60/203,202, filed May 11, 2000.

BACKGROUND OF THE INVENTION

The present invention is directed to pest management and more particularly to controlling a route of travel of crawling vermin, particularly crawling arthropods (including crawling insects) by interrupting their route of travel.

The present invention provides a safe, ecological approach to controlling arthropods. It promotes environmentally-sound methods that employ point source (e.g., point of entry) physical and biological controls versus sole reliance on atomizing, spraying, and broadcasting of chemicals to keep crawling pest populations at tolerable levels. The invention also avoids the mess and toxic exposure associated with prior art pest management apparatus, systems and methods. It also satisfies the U.S. Government's mandate of a 50% reduction in the use of sprayed and broadcasted chemicals by the year 2000.

Crawling insect arthropods can cause serious damage in a variety of different environments. For example, crawling arthropods can bite and/or cause the spread of disease among humans and animals. The pests can also crawl into enclosed spaces where they congregate, nest, and excrete fecal matter, all of which can clog and disrupt the efficient operation of equipment. For example, arthropods can invade and clog virtually any type of conduit as well as telephone junction boxes, electrical boxes, or any enclosed space. Furthermore, crawling arthropods, such as ants, are a problem in that they crawl to invade unenclosed areas where they are unwanted, in or out of doors. Some of the arthropods spread disease while others bite or sting humans and animals. There is a need to prevent ants and other crawling arthropods from progressing in their route of travel to spaces or areas where they are unwanted.

SUMMARY OF THE INVENTION

In accordance with the present invention, there is provided a novel barrier against arthropods or other vermin from crawling unto an object.

In accordance with a more limited aspect of the invention, a holder for isolating an article from a surface is comprised of a receiving member for retaining an article in a position removed from a surface. A crawling arthropod deterring component is applied at least adjacent a lower periphery of the receiving member. A base, situated below the receiving member, supports and stabilizes the receiving member and distributes a load applied by the retained article.

In accordance with another aspect of the invention, a holder for isolating an article from a surface is comprised of a receiving member that is adapted for retaining an article in a position removed from a surface. The receiving member includes a facade that defines an opening therethrough. An axial connector extends down from the opening defined in the receiving member facade and terminates in a base. The base supports and stabilizes the receiving member. An arthropod deterring component is applied to or on an underside of the facade for impeding a route of travel of crawling arthropods. A separately removable adapter which has plug portion is adapted for engaging receipt within the axial connector.

In accordance with yet another aspect of the invention, there is a method for impeding a route of travel of crawling arthropods. An arthropod deterring component is applied to a receiving member supported by a base. The arthropod deterring component is shielded from environment factors. An object that is to be protected from crawling arthropods is supported by the receiving member. Crawling arthropods are deterred from progressing to the object because the arthropod deterring component is placed in their route of travel to the object.

A principal advantage the invention is that by appropriate placement of the device, one is able to interrupt the route of travel of crawling arthropods so that they are unable to travel into areas or onto surfaces where they are unwanted.

Another advantage of the invention is that only a minimum amount of arthropod deterring ingredient is required. Preferably, the arthropod deterring ingredient is impregnated into an expandable soft polymeric material which is applied to the underside of the receiving member.

Yet another advantage of the invention resides in the versatility of the device. The device can be used in a variety of situations and to protect a wide variety of objects from arthropod infestation. Various adapters can be used to accommodate differently shaped objects or articles.

Yet another advantage of the present invention is its ability to deter crawling arthropods and impede their route of travel. The device is portable and can be moved from place to place without destroying or interrupting the effect of the active ingredient.

The barrier of the present invention is long lasting and provides an economical alternative to prior art methods for controlling crawling arthropods in specific areas at point source. It can be used to prevent arthropods from crawling onto cots, bed frames, barbecue grills, incubators, food preparation tables, pellets, picnic tables, outdoor furniture, laboratory storage or rearing racks, banquet tables, play pens, cribs and nursery room furniture, pet food bowls, and a multitude of other objects. It can also be used in recreation vehicle and camping applications, for military applications as well as hospital and healthcare applications. The provision of an adapter that conforms to an object to be protected from crawling arthropods enables the base of the subject invention to be applicable to any number of environments. The device can be used in other situations not mentioned here.

Still other advantages and benefits of the invention will become apparent to those skilled in the art upon reading and understanding of the following detailed description.

BRIEF DESCRIPTION OF THE DRAWINGS

The invention may take physical form in certain parts and arrangement of parts, a preferred embodiment which will be described in detail in the specification and illustrated in the accompanying drawing which form a part hereof.

FIG. 8a shows a coaster in closed shipping formation;

FIG. 8b shows the device as it is being opened;

FIG. 8c shows a fully opened coaster device;

FIG. 10a shows the coaster in its closed shipping arrangement;

FIG. 10b shows the coaster of FIG. 10a in its partially opened arrangement; and

FIG. 10c shows the coaster of FIGS. 10a and 10b in its fully opened and locked position.

DETAILED DESCRIPTION OF THE PREFERRED EMBODIMENT

Figure 1:
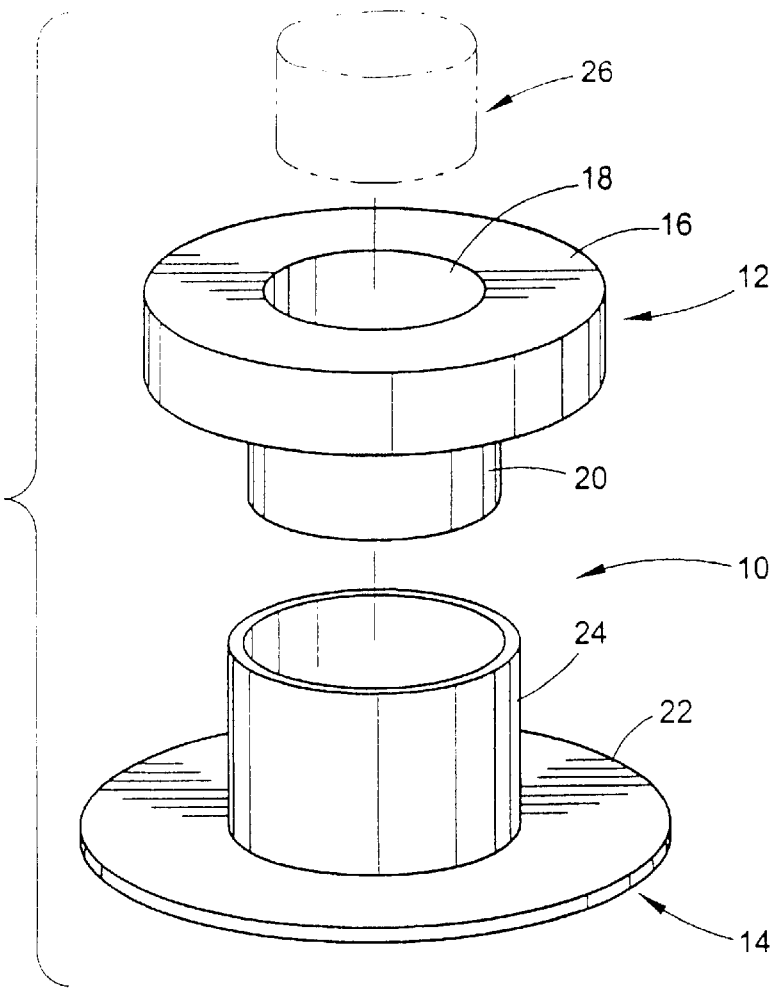
FIG. 1 sets forth an exploded side perspective view of a coaster for shielding against crawling arthropods.

Referring now to the drawings wherein the showing are for purposes of illustrating the preferred embodiment of the invention only and not for purposes of limiting same, the Figures show a coaster device used for shielding against crawling arthropods. The coaster interrupts a route of travel of the crawling pests by deterring their progress. An arthropod deterring component of the coaster device provides the primary impediment.

Directing attention first to FIG. 1, a coaster 10 for shielding against crawling arthropods is presented. The coaster is comprised of a receiving member 12 and the base member 14. The receiving member comprises a generally flat facade 16 which defines an axial opening 18 therethrough. The axial opening extends into an axial connector 20. The base 14 is comprised of a stabilizing portion 22, along with an axial connector 24 extending upward therefrom. The axial connector 24 is designed to telescopically receive the first axial connector 20 that extends from the receiving member. In the alternative, although not shown, it is equally foreseeable that the first axial connector 20 be wider than the second axial connector 24, such that the upper connector is received over the lower axial connector.

There is no required shape for the connector. Although in FIG. 1 the apparatus is shown to be circular in cross-sectional configuration and cylindrical in overall shape, this is merely shown as a preferred example. The shape of the coaster, coupled with the shape of the opening 18 and the axial connector, may vary depending upon the eventual environment where the connector will be utilized. Typically, the shape or configuration of the first axial connector 20 will be such that it readily mates with the shape of the second axial connector 24. There is no limit to the shape of the connectors. They can be square, round, oval, oblong, oblique, curved, or of virtually any configuration that suitably enables the two connectors to mate.

With attention still on FIG. 1, an object to be protected from crawling arthropods is shown in phantom at 26. For example, item 26 may be a table leg which is inserted into the opening 18 and supported by base member 14, with stabilizing member 22.

Figure 2:
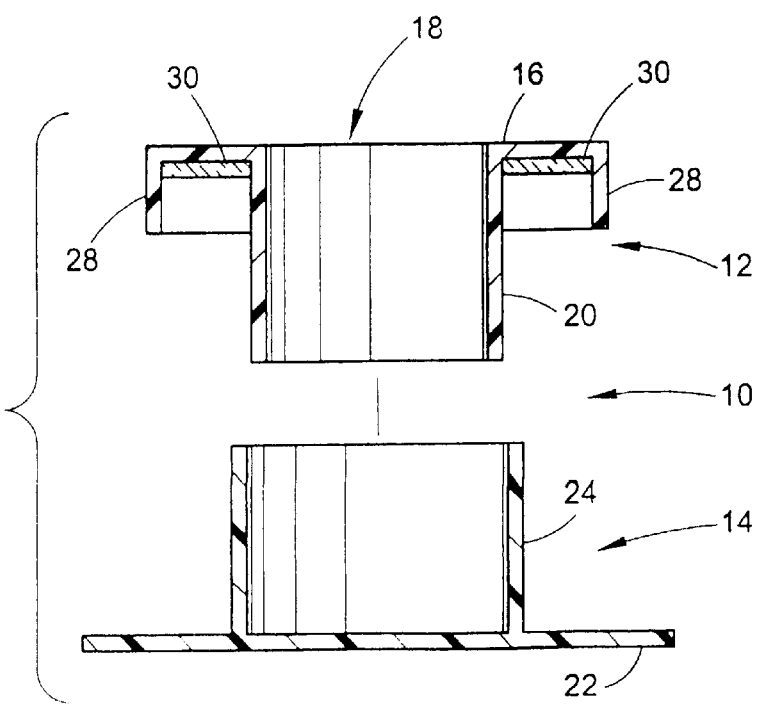
FIG. 2 depicts an exploded cross-sectional side view of a coaster for shielding against crawling arthropods.

Turning now to FIG. 2, an exploded cross-sectional view of the receiving member and base member is shown. As will noted, axial connector 20 is hollow. This enables the receipt of an object therein through opening 18 located at an upper end thereof Although not shown with a bottom wall, it is fully foreseeable that a lower portion of the axial connector 20 could have a wall or floor positioned therein. In accordance with the open-bottom connector 20 shown in FIG. 2, it objects received therein, if they do not rest on facade 16, are intended to rest on stabilizer 22.

A rim or shield 28 extends downward along a periphery of the receiving member. Rim 28 is useful in shielding an arthropod deterring component 30 applied along a lower surface of the receiving member, beneath the facade 16.

As will be noted, the stabilizing portion 22 of base member 14 is continuous and solid while the second axial connector 24 extending upwardly therefrom is open and hollow so that it can receive the first axial connector 20 therein. Hence, an object received through opening 18, if configured such that it does not rest on facade 16, can rest on the stabilizing portion 22.

Figure 3:
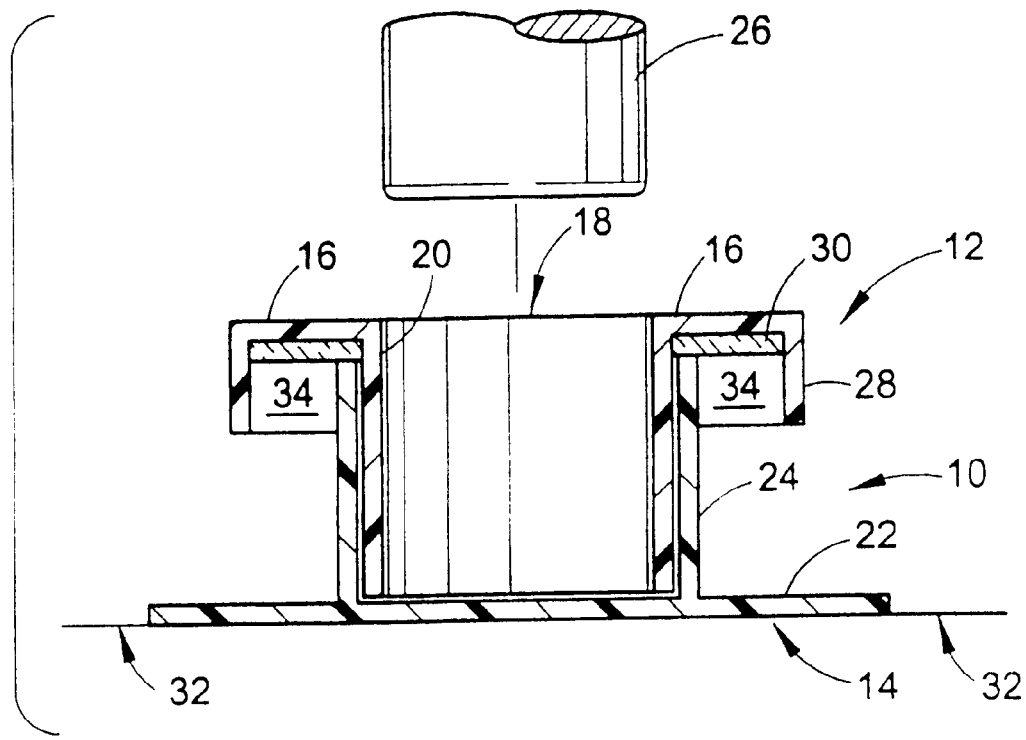
FIG. 3 is a cross-sectional side view of a coaster for shielding against crawling arthropods.

Turning now to FIG. 3 there is shown a cross-sectional view of a coaster device or assembly in its operative form. The receiving member 12 is engagingly received by the base member 14. The first axial connector 20 is received by the second axial connector 24 in an engaging relation. When an object or adapter is received through opening 18, the stabilizing portion 22 distributes the weight and offers stability to the coaster device. The arthropod deterring component 30 is shown to be continuous in an exposed region of the underside of the receiving member. It is not necessary that it be continuous as it is foreseeable that it can be short of or slightly removed from the axial connector 24 and/or rim 28. The arthropod deterring component creates a vapor head in the space or region 34 defined by rim 28, axial connector 24, and the underside of facade 16.

The coaster serves to remove a protected object from a floor or table or other surface 32 upon which it rests. An arthropod crawling along surface 32, in order to reach an object 26 to be inserted in coaster 10 would first have to crawl along the stabilizing 22 up and outer wall of the second axial connector 24 and then along the vermin deterring component 30. The crawling arthropod will be deterred from reaching object 26 either by direct connect with the arthropod deterring component 30 or by the vapor head created in region 34.

Preferably, the arthropod deterring component is comprised of a soft, pliable polymer having a crawling arthropod deterring ingredient molded therein. Of course any suitable pliable material can be used. Preferably, a ring or circle of polymer molded with the deterring ingredient placed within the receiving member and is held in place by adhesive, fasteners or other means or simply by friction fit. The preferred arthropod deterring component molded in the polymer is permethrin, although any other deterring component or pesticide can be used. Alternatively, or in addition, it is foreseeable that the underside of facade 16 be coated with a substance such as petroleum jelly, or with a slippery surface such as Teflon®. Sticky or slippery surfaces provide deterring capabilities for crawling pests and can be used alone or in conjunction with permethrin or other pesticides.

An insecticide, pesticide, repellent or other arthropod-deterring ingredient is molded directly in the pliable polymer material to provide a constant time release emission of vapor from the ingredient. The level of pesticide, insecticide, repellent or other arthropod-deterring ingredient contained in the polymer is sufficiently low and there is no more than minimal contact with human skin during installation, removal, adjustments or the like. However, there is sufficient amount of insecticide within the material to cause an instantaneous repelling or even destruction of the crawling arthropod with which it comes into contact. A vapor head produced by the active material is significant enough to deter or repel many crawling arthropods.

The arthropod deterring component can be simply coated to the underside of facade 16 via an impregnated polymer. It can also be applied within a cartridge or it can be painted or coated on the underside of the facade.

Rim 28 serves to shield the arthropod deterring component from the environment. It also serves to reduce, if not eliminate, possible human or pet contact with the active ingredient. Furthermore, it prevents the ingredient or component from being washed away in rain or dried from direct sunlight.

Figure 4:
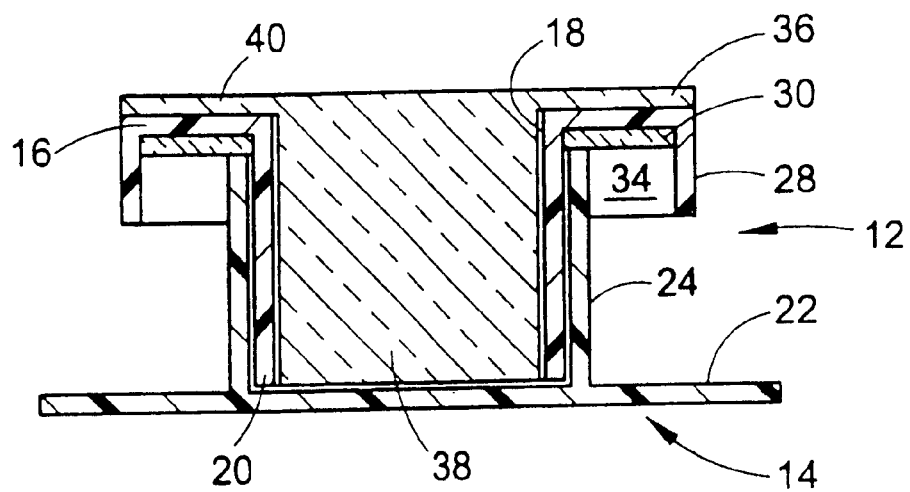
FIG. 4 shows the cross-sectional view displayed in FIG. 3, with a side cross-sectional view of an adapter inserted therein.

FIG. 4 shows a cross-sectional view of a coaster with receiving member 12 and base member 14 engaged together as shown in FIG. 3, however, a pallet adapter 36 is shown inserted in through opening 18 of first axial connector 20. Pallet adapter plug 38 is shown inserted into an opening defined by the first axial connector 20. The plug member is engagingly received by said axial connector. There is no limitation as to the shape of plug and adapter. Preferably, the plug and adapter are of compatible configurations so that they can be suitably engaged. A pallet adapter retaining member 40 rests on the facade 16 of the receiving member. The retaining member is preferably a solid or continuous surface which can hold a pallet thereon. The pallet adapter is designed to hold a pallet load or other object, such as a box. Multiple coasters with pallet adapters in place can be used to support a weight of a pallet load. The combination of the receiving member base and the pallet adapter removes a pallet or box from a floor, ground, or other surface and protects the pallet load from crawling arthropod infestation.

Figure 5:
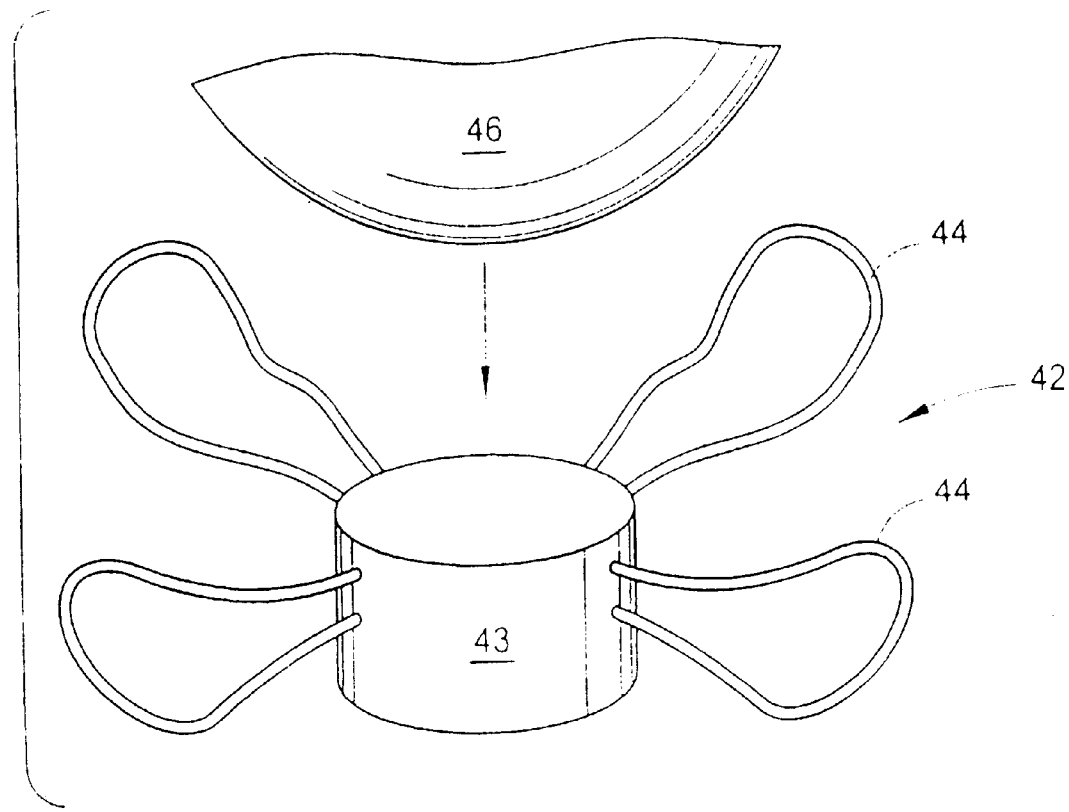
FIG. 5 depicts a perspective view of a pet food bowl adapter and pet food bowl.
Figure 6:
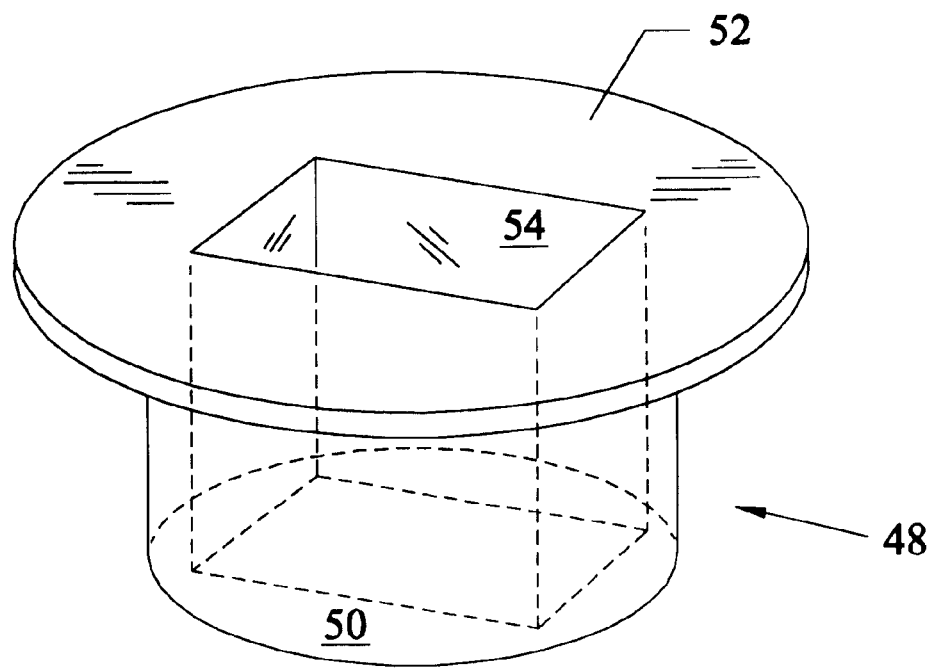
FIG. 6 shows a perspective view of a caster adapter.
Figure 7:
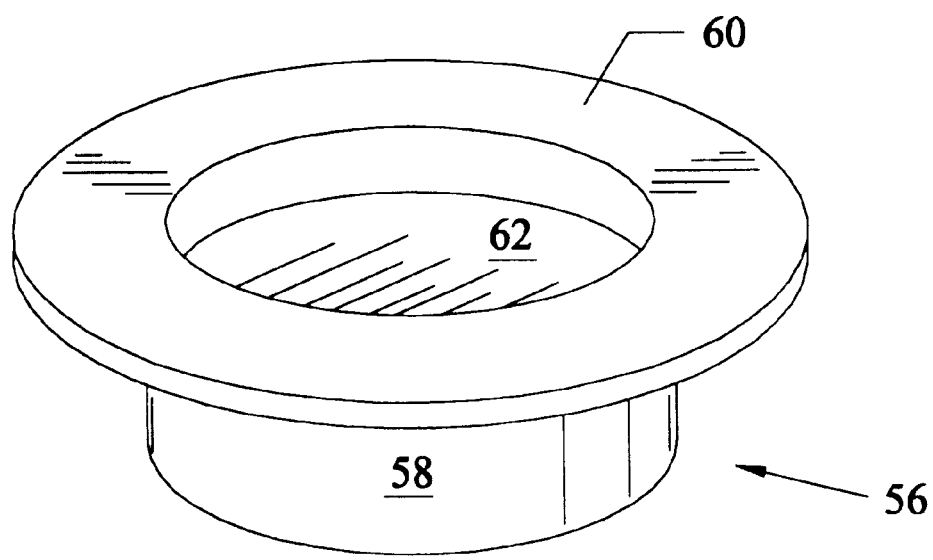
FIG. 7 depicts a perspective view of a shallow leg adapter.

Alternative adapters are shown in FIGS. 5–7.

FIG. 5 shows a pet food bowl adapter 42. The adapter has a pet food bowl adapter plug 43, which is adapted to be inserted into the axial opening 18 and into the first axial connector 20. A shape of the plug should conform to the configuration of the axial opening and axial connector. Although shown in circular format, the configuration could be altered to virtually any format. A plurality of fingers 44 together form a pet food bowl adapter retaining member. The fingers are configured to hold a pet food bowl 46. The fingers 44 may be rigidly pliable, such as a wire configuration so that they can be adjusted to conform to the shape of a pet food bowl. Or they can be formed from a variety of other materials that will hold a pet food bowl in place.

A caster adapter 48 is shown in FIG. 6. As with the other adapters, a caster adapter plug 50 is shown. The plug is adapted to be received through axial opening 18 defined in the receiving member 12. A caster adapter retaining member is shown at item 52 and such retaining member defines an opening therein 54 configured to receive a caster. A caster adapter is useful for backyard barbecue grills, garbage can trolleys, wheel barrels, or any device that rolls on casters or wheels.

Finally, FIG. 7 shows a shallow leg adapter 56, which includes a shallow adapter plug 58 and a shallow adapter retaining member 60. The shallow leg adapter defines an opening 62 which is relatively shallow as compared to the coaster of FIGS. 1–4 where no adapter is shown. The shallow leg adapter is particularly useful for front legs of carts that have just two wheels, wherein the wheels are protected using the caster adapter.

Figure 8A:
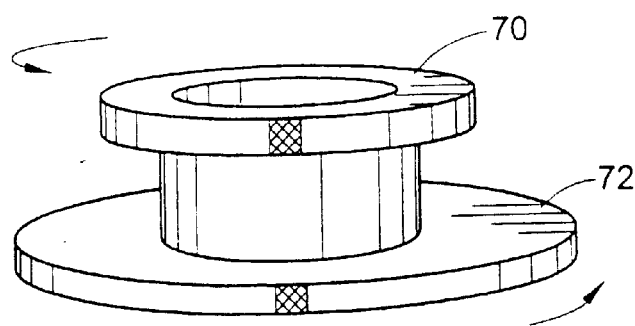
FIGS. 8a–8c show an alternative embodiment coaster device.
Figure 8B:
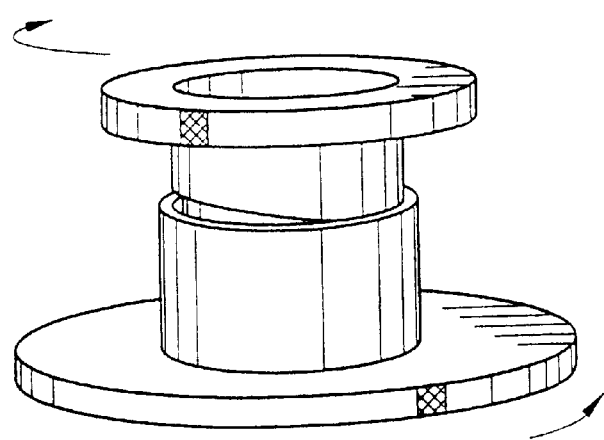
Figure 8C:
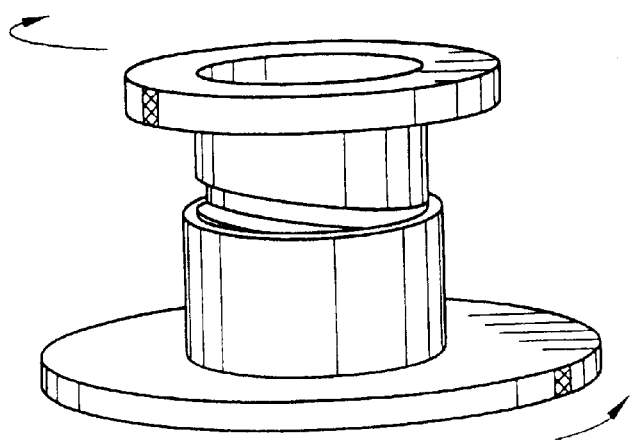

FIGS. 8a–8c show an alternative embodiment of the coaster. Here it is shown that the receiving member 70 and base member 72 are shown initially in a closed position of FIG. 8a. This is the format in which the coaster device can be packaged and/or shipped. By having the receiving member closed to the base member, the shelf life of the product is improved. The arthropod deterring component is not exposed to the air and therefor increases its shelf life.

FIG. 8b shows the unit of FIG. 8a in a partially opened position. Threads on an axial connector allow the elements to twist apart from each other, raising the receiving member away from the base.

Finally, FIG. 8c shows the receiving member and base member components in a fully open position. The embodiment of FIGS. 8a, 8b, and 8c enables the adjustment in size and height of the coaster to serve particular needs.

Figure 9:
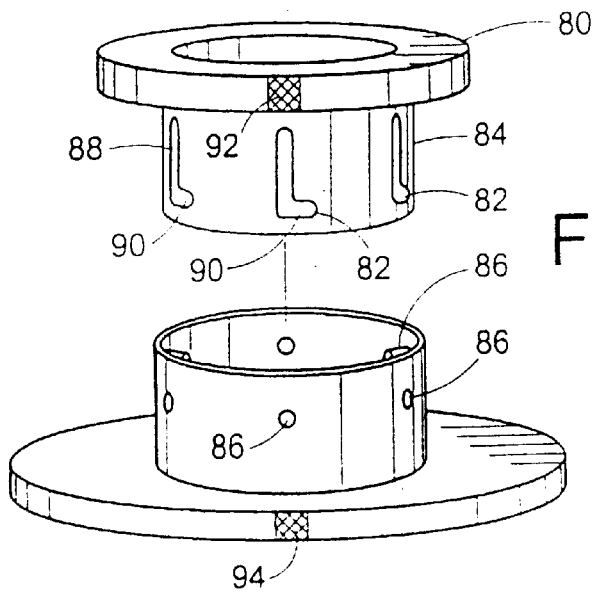
FIG. 9 depicts an exploded view of a locking coaster arrangement.

FIG. 9 shows yet another alternative embodiment of the coaster. Here, receiving member 80 is shown wherein grooves 82 are defined in first axial connector 84. Mating knobs 86 are situated along a lower axial connector. The grooves 82 are "L" shaped and adapted to receive mating knobs 84. The vertical arm 88 of the grooves provides for the vertical motion of the receiving member with respect to the base member. When the mating knobs reaches the horizontal arm 90 of the grooves, the receiving member and base member are turned in opposing directions such that the knobs lock into the horizontal section, preventing relative vertical motion between the receiving member and base member.

Figure 10A:
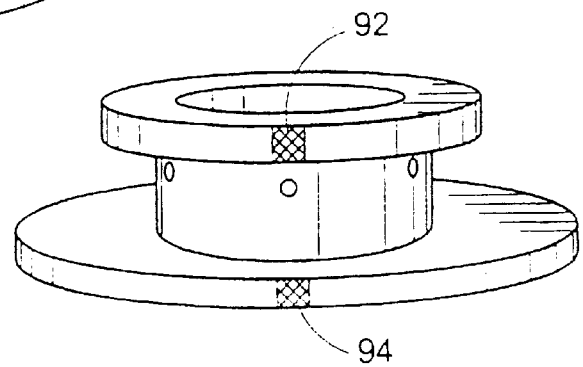
FIGS. 10a–10c show the alternative embodiment coaster of FIG. 9.
Figure 10B:
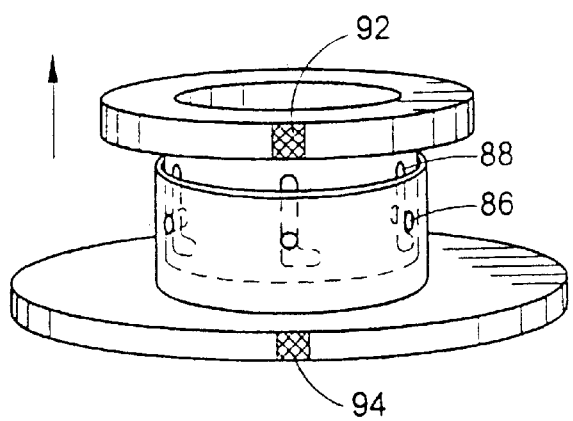
Figure 10C:
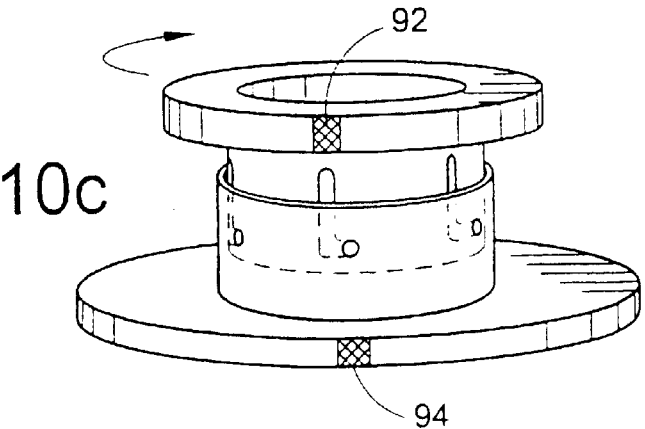

The device of FIG. 9 is shown in its fully closed packaging or shipping position in FIG. 10a. As shown in FIG. 10b, the receiving member 80 is raised straight up, such that the notches or knobs 86 remain in the vertical portion 88 of the grooves. As shown in FIG. 10c, the upper receiving member is twisted to lock the retaining member in an open position apart from the base. The knobs 86 are situated in the horizontal section of the grooves. Grip members 92, 94 can be used to aid in the twisting motion.

Figure 11:
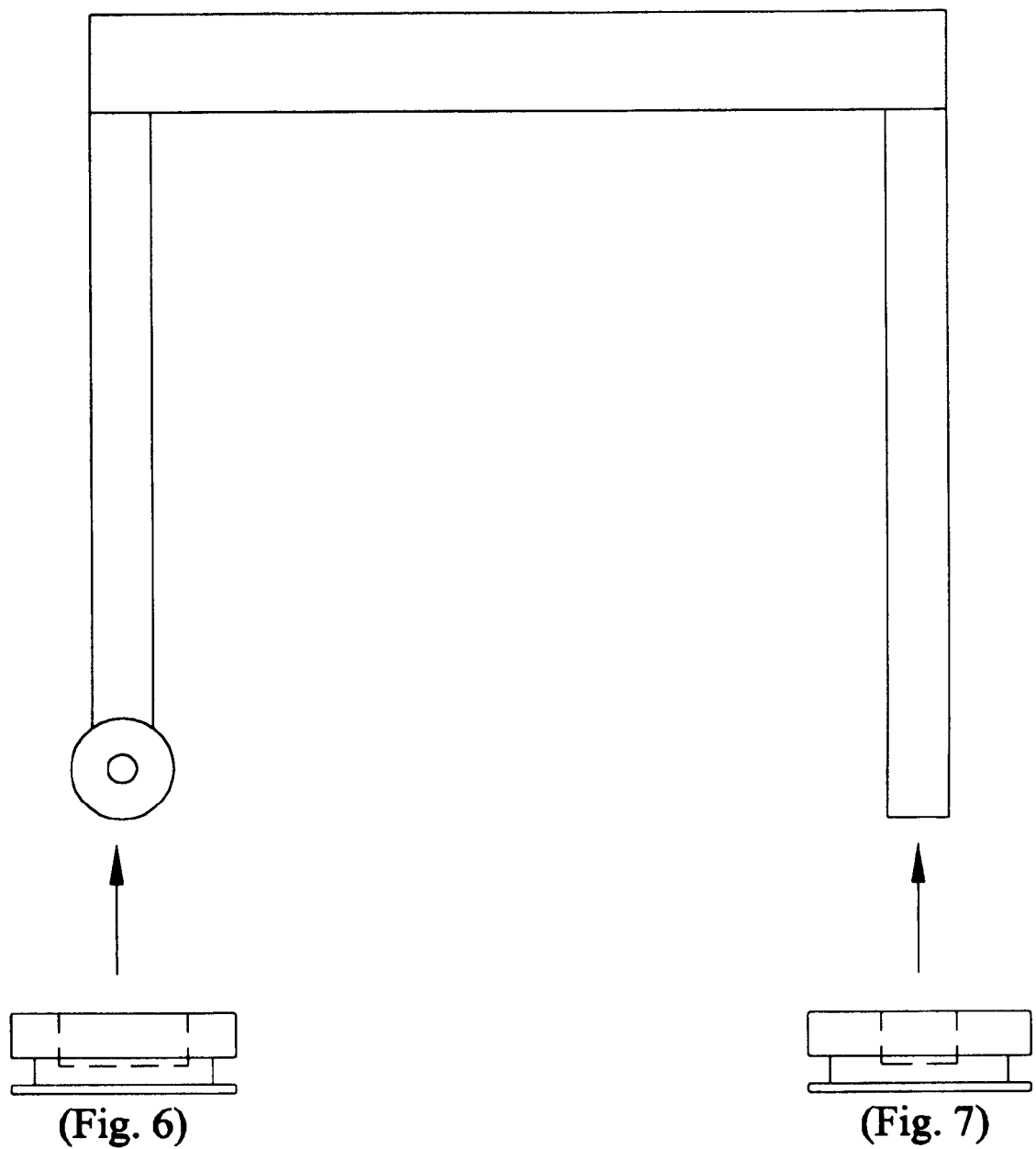
FIG. 11 shows a cart with wheels and legs being used with the coasters of FIGS. 6 and 7.

FIG. 11 shows a cart with wheels and legs being used with the coasters of FIGS. 6 and 7.

The invention has been described with reference to the preferred embodiments. Obviously, modifications and alterations will occur to others upon reading and understanding of this specification. It is intended to include all such modifications and alterations in so far as they come within the scope of the appended claims or the equivalent thereof.

What is claimed is:

1. A holder arrangement for isolating objects from crawling arthropods comprising in combination:

an object to be protected having at least one rotatable member extended downward beneath the object, the at least one rotatable member being selected from one of a wheel and a caster, and at least one stationary leg not having any rotatable member thereon;

an adapter having a shallow opening with an internal planar surface floor that is perpendicular to side walls of the opening, for allowing a portion of the at least one stationary leg to abut against the internal planar surface floor, the adapter having a connector portion;

a coaster having a receiving portion for telescopically receiving the connector portion of the adapter;

a shield adjacent to the coaster; and an arthropod deterring material attached to an undersurface of the shield for deterring crawling arthropods from reaching the object, wherein the shield protects humans from contacting the arthropod deterring material.

2. A holder arrangement for isolating cart objects from crawling arthropods in combination with an object to be protected having at least one rotatable member extended downward beneath the object, the at least one rotatable member being selected from one of a wheel and a caster, and at least one stationary leg not having ally rotatable member thereon, comprising;

a first coaster having a first receiving portion with an interior surface for supporting the at least one rotatable member thereon;

a first shield adjacent to the first coaster;

a second coaster having a second receiving portion with an interior surface for supporting the at least one stationary leg thereon, the first receiving portion of the first coaster being substantially different from the second receiving portion of the second coaster;

a second shield adjacent to the second coaster; and arthropod deterring materials attached to undersurfaces of the first shield and the second shield for deterring crawling arthropods from reaching the object, wherein the first and the second shields protect humans from contacting the arthropod deterring materials.

3. The holder arrangement of claim 2, wherein the object includes:

a cart having two rotatable members and two legs.

4. The holder arrangement of claim 2, wherein the first coaster includes:

a substantially deep rectangular opening for receiving a substantial portion of the at least one rotatable member therethrough, the deep rectangular opening having a rectangular planar bottom floor that is perpendicular to four side walls of the opening, the floor for supporting the at least one rotatable member thereon.

5. The holder arrangement of claim 2, wherein the second coaster includes:

a shallow opening with an internal planar surface floor that is perpenidicular to side walls of the opening, the floor for supporting the at least one stationary leg thereon.

6. The holder arrangement of claim 2, further comprising:

an adapter for the first coaster, the adapter having a substantially deep opening for receiving a substantial portion of the at least one rotatable member therethrough, the adapter having a downwardly projecting plug portion which is telescopingly connected with the first receiving portion of the first coaster.

7. The holder arrangement of claim 2, further comprising:

an adapter for the second coaster, the adapter having a shallow opening with an internal surface for allowing a portion of the at least one stationary leg to abut against the internal surface, the adapter having alower portion which 8. A method for impeding a route of travel of crawling arthropods from reaching movable carts having both downwardly extending rotatable members having at least one of a caster and a wheel, and stationary legs not having any rotatable members thereon, comprising the steps of:

providing at least one coaster on a surface beneath a moveable cart, the cart having downwardly extending rotatable members selected from one of a caster and a wheel, and stationary legs not having rotatable members thereon, the at least one coaster having a receiving portion adjacent to an upper side of the coaster, the receiving portion having a receiving opening;

telescopically receiving a connector portion of an adapter into the receiving opening of the at least one coaster, the adapter having a shallow opening with an interior planar floor surface that is perpendicular to side walls of the opening;

inserting a stationary leg from the cart not having any rotatable members thereon into the shallow opening to abut against the interior planar floor surface in the adapter; and deterring crawling arthropods from progressing to the movable cart from the surface by attaching an arthropod deterring material to an undersurface portion of a shield adjacent to the at least one coaster, wherein the shield protects humans from contacting the arthropod deterring material.

\* \* \* \* \*